2,937,158
PROCESS FOR FORMING RESINS FROM PHENOLS AND HYDROPYROLYSIS PRODUCTS OF LIGNO-CELLULOSE

Francis H. Snyder, Newtown, Conn., assignor to Francis H. Snyder and Associates, Incorporated, New Milford, Conn., a corporation of Connecticut No Drawing. Application June 28, 1956
Serial No. 594,366

8 Claims. (Cl. 260—56)

This invention relates to synthetic resinous materials derived from phenols and a reaction product obtained by the catalytic hydropyrolysis of lignocellulose materials.

It has long been known that cellulose containing materials and polysaccharides can be made to yield monosaccharides by the controlled treatment thereof in the presence of acid, under heat and pressure. This process is especially well known in the conversion of corn starch to corn sugar. What is not so widely known is that cellulose materials and saccharides, upon further treatment with acid, yield hydroxymethylfurfural, humin and levulinic acid. The product, 5-hydroxymethyl-2-furfuraldehyde or more briefly, hydroxymethylfurfural, in spite of the wide availability of raw material from which it may be prepared, has heretofore been considered a rare chemical. Recently, the price of $75 has been quoted for ten gram quantities. The high price may be attributed to the difficulty of obtaining and keeping it in pure condition. It is much more highly reactive than its companion homologue, furfural; although hydroxymethyl-furfural in a pure state, at slightly more than room temperature, is a colorless liquid, it rapidly becomes yellow and then brown in the presence of light and air. These common properties plus the known presence of the methylol group in the already reactive furfural ring would normally have induced investigation of this compound for the production of synthetic resins. However, the same acid catalyst that brings about the production of this substance from cellulose and saccharide materials also produce either collaterally or by further breakdown of hydroxymethylfurfural, humin, levulinic acid and formic acid.

Recently, it has been found that cellulose and ligno-cellulose raw materials when impregnated with a strong acid but in the substantial absence of a liquid phase, when treated with steam under conditions that would support exothermic pyrolysis in the absence of steam, quickly yield a liquid phase containing large amounts of hydroxymethylfurfural and a semi-solid resinous mass which, if it does not contain large amounts of hydroxymethylfurfural and its polymers, nevertheless, behaves as if it contains substantial amounts of hydroxymethylfurfural. The hydroxymethylfurfural containing portion can be recovered from the liquid phase at small expense and in comparatively pure condition by a simple extraction operation and thereafter may be employed in suitable reactions. The resinous material obviously cannot be easily characterized. A substantial portion of it is probably depolymerized lignin but this cannot account for the entire product. The yield of hydropyrolized solid, from red oak, for example, is approximately two times as great as the calculated lignin content of the wood and it is obvious therefore, both from the quantity of material obtained and the substantial disappearance of wood fibers, that the cellulose content of the wood has largely been converted into material having many reactive properties common to hydroxymethylfurfural. This resinous reaction mass, especially that portion of it soluble in oxygenated organic solvents such as the alcohols and ketones, has been found to react with the phenols to produce highly desirable synthetic resins.

In the catalytic process a ligno-cellulose material, for example, hard wood, in the form of relatively small chips or slivers, is treated with a dilute acid solution having a concentration of acid from about 0.05 to about 5 percent and preferably from about 0.3 to about 1 percent, until the chips or slivers have absorbed an amount of acid solution preferably somewhat less than the weight of the ligno-cellulose material on a bone dry basis. Excess acid solution is then preferably removed from the chips or slivers by draining, centrifuging or the like, following which they are charged into a reaction vessel which has been preheated preferably to within 20 to 30° F. of the reaction temperature subsequently to be used. High temperature, high pressure steam is then introduced into the reaction vessel to quickly bring the charge up to reaction temperature and pressure, where it is maintained throughout a relatively short reaction period. The material is then rapidly discharged from the reaction vessel into a separator from which the volatiles pass off to the atmosphere or to suitable recovery apparatus, and from which the liquids and solids are withdrawn for further processing to separate the liquids and recover the novel reaction product, and if desired, various other products of the hydrolysis.

The hydrolysis is conducted in a non-aqueous phase at pressures between about 500 and about 1250 pounds per square inch and at the corresponding temperatures, as indicated by the table of properties of saturated steam the preferred operating range of pressures and temperatures being from about 750 to 1250 pounds per square inch and from about 513° F. to about 574° F. The time of treatment may be varied from about 10 to 800 seconds but must be coordinated with the particular temperatures and pressures used. Thus while a rather wide range of time of treatment is possible within the extreme limits of temperature and pressure, the necessity for proper coordination, as indicated, considerably narrows the range for particular temperature and pressure conditions.

It has now been found that by reacting the described hydrolysis product with a phenol in the presence of a basic or acid catalyst, synthetic resins of great activity and utility are formed. In carrying out the process with a basic catalyst, such as caustic soda, the hydrolysis product is preferably first extracted with an oxygenated organic solvent, such as acetone or methylethylketone, and the extract recovered. The solvent is then removed from the extract by distillation following which dilute caustic soda solution preferably having a concentration from about 8 to 12 percent is added in an amount sufficient to provide a pH of about 10.5 to about 11.5. This corresponds to about 4 to 6 percent, by weight, of caustic soda, based on the soluble solids portion of the hydrolysis product.

Sufficient water is then added to the mix to give a total solids concentration of approximately 50 to 60 percent whereupon commercial phenol is added in an amount equivalent to about 1 mol of phenol per two mols of apparent hydroxymethylfurfural content in the product. As indicated in my prior copending Patent 2,776,948, any excess of phenol over hydroxymethylfurfural over 1:1 fails to react; hence the equivalent hydroxymethylfurfural content of a crude hydrolysis product may be determined by making test batches of resin using decreasing amounts of phenol. The mixture is heated to 60–70° C. for a period of time from about 30–100 minutes, depending upon the degree of polymerization of the resin desired. The resulting reaction mixture is cooled and the resin may be separated by the addition of a mineral acid to a pH of approximately 7.0 or the alkaline mix may be used as a binder or as a beater addition resin directly.

In the preparation of the above described resins, boiling, even for short periods, tends to result in over-polymerization and hence should be avoided. It has been found that much better products are obtained at temperatures ranging from about 60–70° C., and hence this range is preferred.

In carrying out the process with a basic catalyst, such as barium hydroxide, the described hydrolysis product is extracted with alcohol (methyl, ethyl, isopropyl or the like) and concentrated to a solids content of about 50 percent. Phenol and barium hydroxide are then added during rapid agitation, following which the solution is refluxed or heated at about 80–90° C. for 20–60 minutes or until the free phenol has largely disappeared. The solution is then cooled to about 50° C., dilute acid added in a quantity just sufficient to precipitate the barium ion as an insoluble salt of the acid, and the precipitate removed in any suitable manner as by settling and decanting, filtering, or centrifuging. The resulting resin solution may be used as an impregnating varnish for the manufacture of paper or fabric based laminates, as an impregnant for paper, textiles, wood, and glass-fiber products, and so forth.

The process may be carried out with an acid catalyst in much the same manner as described in connection with the use of barium hydroxide. In such case, an alcoholic solution of the hydrolysis product, containing phenol and acid, is refluxed for 60–180 minutes following which the acid is neutralized by the addition of an equivalent amount of base which will form a precipitate consisting of a salt of the acid. The precipitate may then be removed by filtration and the resulting solution is a true novolac resin, permanently soluble and fusible.

The following examples will serve to illustrate the invention. In these examples, the hydrolysis product utilized was the solid reaction product obtained by the steam hydrolysis of acid impregnated oak wood chips at a pressure of approximately 1000 pounds per square inch gauge for a period of time of about 90 seconds.

*Example A*

Hogged red oak chips averaging 1 x 1 x ⅜" were soaked in $H_2SO_4$ (1.2% by weight in water) until about 8 lb. $H_2SO_4$ per ton of dry wood substance was taken up. The drained chips were loaded into a heated reaction chamber, held for 30 sec. at 1000 p.s.i. and then explosively discharged by a quick-opening valve. The aqueous phase was separated from the resinous material by centrifugal action to produce 35.4% solids. After water washing at room temperature, this was extracted with acetone, filtering off the insoluble fraction and then evaporating the acetone from the solution to yield a fusible resinous material amounting to 60.5% of the solids or 21.25 of the original wood.

*Example B*

Water washed solid as in Example A was extracted with 50 percent aqueous acetone to produce a solid product amounting to 28.5 percent based on the solid starting material.

*Example C*

Using ethyl acetate as the extractant in the previous process, the yield was 23.6 percent.

*Example D*

Using ethyl alcohol as the extractant the yield was 22.8 percent.

*Example E*

Using iso-amyl alcohol as the extractant in the previous process, the yield was 26.0 percent.

*Example F*

Using methyl isobutyl ketone as the extractant, the yield was 17.6 percent.

*Example 1*

2.5 kilograms of dry, acetone-extracted hydrolysis product dissolved in 2.5 liters of 0.4 N NaOH was warmed to 45° C. and 470 grams of phenol added. The temperature was raised to 60–70° C. and maintained for 30–100 minutes. The batch was then cooled to about 30° C. and neutralized with dilute (about a 10% solution) sulfuric acid (pH 7.0±.2). The resin was precipitated as an amorphous granular solid having a softening point of about 45–60° C.

Alternatively, the batch may be cooled to room temperature (20–25° C.) and used as a resin solution (containing about 55% solids) for such applications at beater adidtion, plywood adhesive, binders, laminating varnish and so forth.

*Example 2*

The described hydrolysis product was extracted with ethyl alcohol and concentrated to a solids content of about 50%. To 2.0 kilograms of solid, soluble hydrolysis product in 2.0 kilograms of alcohol was added 375 grams of phenol and 40 grams of $Ba(OH)_2$ dissolved in about 120 ml. of hot water. The mixture was subjected to rapid agitation during such addition. The solution was refluxed or heated at about 80–90° C. for 20–60 minutes or until the free phenol had largely disappeared. The solution was then cooled to about 50° C., dilute $H_2SO_4$ added in just sufficient quantity to precipitate the barium ion as the insoluble sulphate, and the precipitate removed. The resulting resin solution may be used as an impregnating varnish for the manufacture of paper or fabric based laminates; as an impregnant for paper, textiles, wood, glass-fiber products and so forth.

*Example 3*

To a 50% solids solution of the described hydrolysis product in alcohol (1.0 kilogram solids) was added 375 grams of phenol and 22 grams of oxalic acid dissolved in a small amount of hot water. This batch was refluxed for 60–180 minutes, the oxalic acid neutralized by the addition of an equivalent amount of $Ca(OH)_2$ (dissolved in water) and the solution filtered to remove the precipitated calcium oxalate. The resulting solution was a true novolac resin, permanently soluble and fusible. The alcohol was removed by distillation and the resin dehydrated under reduced pressure at 100–140° C. The molten resin was cast in pans and allowed to cool. It had a melting point of about 100° C. and cured at 290–380° C. upon addition of hexamethylene tetramine.

In an alternative procedure, the alcohol solution of the resin may have added to it about 5–10% of hexamethylene tetramine, based on the phenol content, and used as a 2-stage resin varnish for paper, textiles, laminates, glass fiber and so forth.

Resins prepared in th emanner set forth in the above description and examples are much superior to products made by simple extension of 1- or 2-stage phenolics with lignin or the described hydrolysis product. They are fully reactive and set to firm tenacious products. In general, the products are superior if the acid or base used as a catalyst can be precipitated as an insoluble salt by an appropriate base or acid. Electrical properties, as well as some of the physical and chemical properties are considerably improved if soluble salts, acids and bases are thus eliminated. This type of catalyst, therefore, is preferred, and while specific examples of such catalysts have been given, the use of equivalent materials of this nature is contemplated.

The amount of phenol added will generally vary according to several of the process variables such as: the species of wood employed, the time, temperature and amount of catalyst used in the high pressure reaction, and the amount, kind and temperature of application of solvent, if one is used. Such variations are no more than is to be expected in dealing with raw materials of such variable but analogous character as the various species of wood. It is equally obvious that many homologues and analogues of phenol may be used in lieu thereof. Specifically, besides phenol, there may be used, resorcinol, the cresols, the xylenols, crude mixtures of the foregoing such as coal tar distillates and the mixed distillates obtained from the low temperature hydrogenation of coal, the mono and dihydroxy biphenyls, especially p-hydroxy biphenyl and p, p' hydroxy biphenyl, and the bisphenols formed by the substitution of two phenols for oxygen in the ketones. Generally those phenolic susbstances which have the larger number of positions where methylol groups may enter, provide the most useful resins as they tend to promote cross-linking.

I claim:

1. The process of preparing a synthetic resinous material which comprises mixing the non-aqueous, resinous portion of the hydrolysis product obtained by the hydropyrolysis of acid-impregnated ligno-cellulose material at pressures between 500 and 1260 p.s.i. and the corresponding saturated steam temperatures for periods of 800 to 10 seconds with dilute caustic and a phenol of the class consisting of hydroxybenzene, resorcinol, and cresols, xylenols, crude mixtures thereof and the mono- and di-hydroxy biphenyls and heating the mixture to bring about the resin-producing reaction.

2. The process as set forth in claim 1 wherein the reaction is carried out at reflux temperature.

3. The process of claim 1 wherein the reacting ingredients are employed in the ratio of one mol of phenol per two mols hydroxymethylfurfural equivalent.

4. The process as set forth in claim 3 wherein the phenol is hydroxybenzene.

5. The process of preparing a synthetic resinous material which comprises mixing the non-aqueous, resinous portion of the hydrolysis product obtained by the hydropyrolysis of acid-impregnated ligno-cellulose material at pressures between 500 and 1260 p.s.i. and the corresponding saturated steam temperatures for periods of 800 to 10 seconds with an oxygenated aliphatic solvent, removing the insoluble portion and adding sufficient dilute caustic to the extract to give a pH from about 10.5 to about 11.5, adding a phenol of the class consisting of hydroxybenzene, resorcinol, the cresols, xylenols, crude mixtures thereof, the mono- and di-hydroxy biphenyls, and heating the resulting mixtures at reflux temperature for a period of time from about 15 minutes to about one hour.

6. The process of claim 5 wherein solvent is removed from the solvent extract of hydropyrolysis product before reaction of the same with the phenol.

7. The process of preparing a synthetic resinous material which comprises subjecting acid impregnated lignocellulose material to hydropyrolysis at pressures between 500 and 1250 p.s.i. and the corresponding temperatures for periods of 800 to 10 seconds, recovering the solid reaction product, dissolving the solid reaction product in dilute caustic soda to a pH between about 10.5 and about 11.5, adding a phenol of the class consisting of hydroxybenzene, resorcinol, the cresols, xylenols, crude mixtures thereof, the mono- and di-hydroxy biphenyls to the solution, and refluxing the mixture for a period of time from about 15 minutes to an hour.

8. The process of claim 7 wherein that portion of the solid hydropyrolysis product insoluble in the dilute caustic is removed from the locus of reaction before adding the phenol.

References Cited in the file of this patent

UNITED STATES PATENTS

| | | |
|---|---|---|
| 2,197,724 | Hovey et al. | Apr. 16, 1940 |
| 2,319,951 | Schorger | May 25, 1943 |
| 2,397,323 | Trefz et al. | Mar. 26, 1946 |
| 2,560,299 | McElhenney | July 10, 1951 |
| 2,776,948 | Snyder | Jan. 8, 1957 |

FOREIGN PATENTS

| | | |
|---|---|---|
| 583,021 | Great Britain | Dec. 5, 1946 |